(12) United States Patent
Wu et al.

(10) Patent No.: US 8,830,478 B2
(45) Date of Patent: Sep. 9, 2014

(54) OPTICAL FREQUENCY COMB STIMULATED BRILLOUIN SCATTERING GYROSCOPE

(71) Applicant: Honeywell International Inc., Morristown, NJ (US)

(72) Inventors: Jianfeng Wu, Tucson, AZ (US); Tiequn Qiu, Glendale, AZ (US); Glen A. Sanders, Scottsdale, AZ (US); Lee K. Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 129 days.

(21) Appl. No.: 13/693,321

(22) Filed: Dec. 4, 2012

(65) Prior Publication Data

US 2014/0152994 A1 Jun. 5, 2014

(51) Int. Cl.
*G01C 19/72* (2006.01)
*H01S 3/00* (2006.01)
*H01S 3/30* (2006.01)
*G01C 19/66* (2006.01)

(52) U.S. Cl.
CPC ............ *G01C 19/661* (2013.01); *G01C 19/727* (2013.01); *H01S 3/302* (2013.01); *H01S 3/30* (2013.01)
USPC .......................................... 356/461; 359/334

(58) Field of Classification Search
CPC ...... G01C 19/66; G01C 19/661; G01C 19/72; G01C 19/723; H01S 3/30; H01S 3/302
USPC ................... 356/460, 461, 463, 464; 359/334
See application file for complete search history.

(56) References Cited

U.S. PATENT DOCUMENTS

| 4,159,178 | A | | 6/1979 | Vali et al. |
| 4,396,290 | A | | 8/1983 | Morris |
| 4,863,272 | A | | 9/1989 | Coccoli |
| 5,323,415 | A | * | 6/1994 | Quast et al. ..................... 372/94 |
| 5,408,317 | A | | 4/1995 | Dyes et al. |
| 5,517,305 | A | | 5/1996 | Raab |
| 5,537,671 | A | | 7/1996 | Toyama |
| 7,372,574 | B2 | * | 5/2008 | Sanders et al. ................ 356/461 |
| 8,659,760 | B2 | * | 2/2014 | Sanders et al. ................ 356/461 |

OTHER PUBLICATIONS

Abd-Rahman, M. Kamil et al. "Multiwavelength, bidirectional operation of twin-cavity Brillouin/erbium fiber laser". Optics Communications 181, Jul. 1, 2000, pp. 135-139.*

(Continued)

*Primary Examiner* — Michael A Lyons
(74) *Attorney, Agent, or Firm* — Fogg & Powers LLC (57) ABSTRACT

Systems and methods for measuring rotation using an optical frequency comb stimulated Brillouin scattering gyroscope are provided. In certain embodiments, a system comprises a light source that produces a multiple-frequency light beam based on an optical frequency comb; and an optical fiber resonator coupled to the light source, the multiple-frequency light beam propagating in a first direction within the optical fiber resonator, wherein the multiple-frequency light beam generates stimulated Brillouin scattering (SBS) for a frequency, wherein the Brillouin scattering generates an SBS light beam to propagate in a second direction, the first direction being opposite in direction to the second direction. The system also comprises a servo to control the frequencies of the optical frequency comb to lock a plurality of component frequencies on resonance peaks of the optical fiber resonator; and a mixer that determines a frequency difference between the SBS light beam and the multiple-frequency light beam.

20 Claims, 4 Drawing Sheets

(56) References Cited

OTHER PUBLICATIONS

European Patent Office, Office Action from EP Application No. 13191290.9 mailed Feb. 21, 2014 from Foreign Counterpart of U.S. Appl. No. 13/693,321, Feb. 21, 2014, pp. 1-6, Published in: EP.

Zarinetchi et al., "Stimulated Brillouin fiber-optic laser gyroscope", "Optics Letters", Feb. 15, 1991, pp. 229-231, vol. 16, No. 4, Publisher: Optical Society of America, Published in: New York, NY.

* cited by examiner

OPTICAL FREQUENCY COMB STIMULATED BRILLOUIN SCATTERING GYROSCOPE

BACKGROUND

There is a need for low cost, high performance gyroscopes for navigation systems, precision point systems, and guidance systems. Passive optical resonator gyroscopes, such as resonator fiber optic gyroscopes, are a type of gyroscope that is a promising contender for a next generation navigation grade gyroscope. Passive optical resonator gyroscopes have the potential to provide a solution that has high resolution at a low cost. Passive optical resonator gyroscopes are gyroscopes that use the Sagnac effect to measure resonance frequency shifts due to inertial rotation in a resonator, where the resonator does not contain the laser light source. However, passive optical resonant gyroscopes generally include multiple laser sources and complicated locking schematics, or optical frequency shifters, which significantly increase production cost. Further, if an optical fiber resonator is used, which may allow for a high sensitivity in comparison to a rotation rate, the laser light intensity within the fiber resonator coil generates Brillouin scattering within the fiber resonator coil of the gyroscope, where the Brillouin scattering degrades the performance of the gyroscope.

SUMMARY

Systems and methods for measuring rotation using an optical frequency comb stimulated brillouin scattering gyroscope are provided. In certain embodiments, a system comprises a light source configured to produce a multiple-frequency light beam based on an optical frequency comb; and an optical fiber resonator coupled to the light source, the multiple-frequency light beam based on an optical frequency comb generated by the light source propagating in a first direction within the optical fiber resonator, wherein the multiple-frequency light beam based on an optical frequency comb generates stimulated Brillouin scattering for at least one frequency, wherein the Brillouin scattering generates a stimulated Brillouin scattering light beam containing at least one frequency component to propagate in the optical fiber resonator in a second direction, the first direction being opposite in direction to the second direction. The system also comprises at least one servo that controls the frequencies of the optical frequency comb so that a plurality of component frequencies of the optical frequency comb are locked on resonance peaks of the optical fiber resonator in the first direction; and a mixer configured to determine a frequency difference between the stimulated Brillouin scattering light beam and the multiple-frequency light beam.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The systems and methods described herein provide a low cost, high performance gyroscope using a single laser source that produces an optical frequency comb. In one embodiment, the optical frequency comb propagates through a gyroscope resonator in a first direction, where the optical frequency comb generates stimulated Brillouin scattering (SBS) in a second direction that is opposite to the first direction. For example, the optical frequency comb propagates in a clockwise (CW) direction around the gyroscope resonator and the light generated by stimulated Brillouin scattering (SBS) propagates in a counterclockwise (CCW) direction around the gyroscope resonator. The optical frequency comb is locked to the resonances in the first direction (CW) through servo electronics that control the laser source. The generated SBS light frequencies are automatically located to the resonance frequency of the second direction (CCW) due to maximum gain at those frequencies. The differences of the resonance frequencies in the two opposite directions contain information about the rotation rate of the gyro. The combination of the optical frequency comb and the SBS light can significantly reduce the cost of a navigation grade resonator fiber optic gyroscope. In particular, the gyroscope described herein, uses an optical frequency comb and SBS light to detect rotation rate. Further, because the SBS light is frequency shifted by a Brillouin shift (typically about 11 GHz) associated with the material used to fabricate the optical fiber in the resonator, the SBS light and the optical frequency comb do not overlap. Because the optical frequency comb and the SBS light do not have overlapping frequency spectra, the optical frequency comb and the SBS light do not lock on to one another when the CW wave backscatters into the CCW direction, or vice versa. Thus the gyroscope is able to avoid the well-known backscatter-induced lock-in effects that degrade gyroscope performance in conventional ring laser gyroscopes (RLGs) that are used in many navigation applications.

Figure 1:
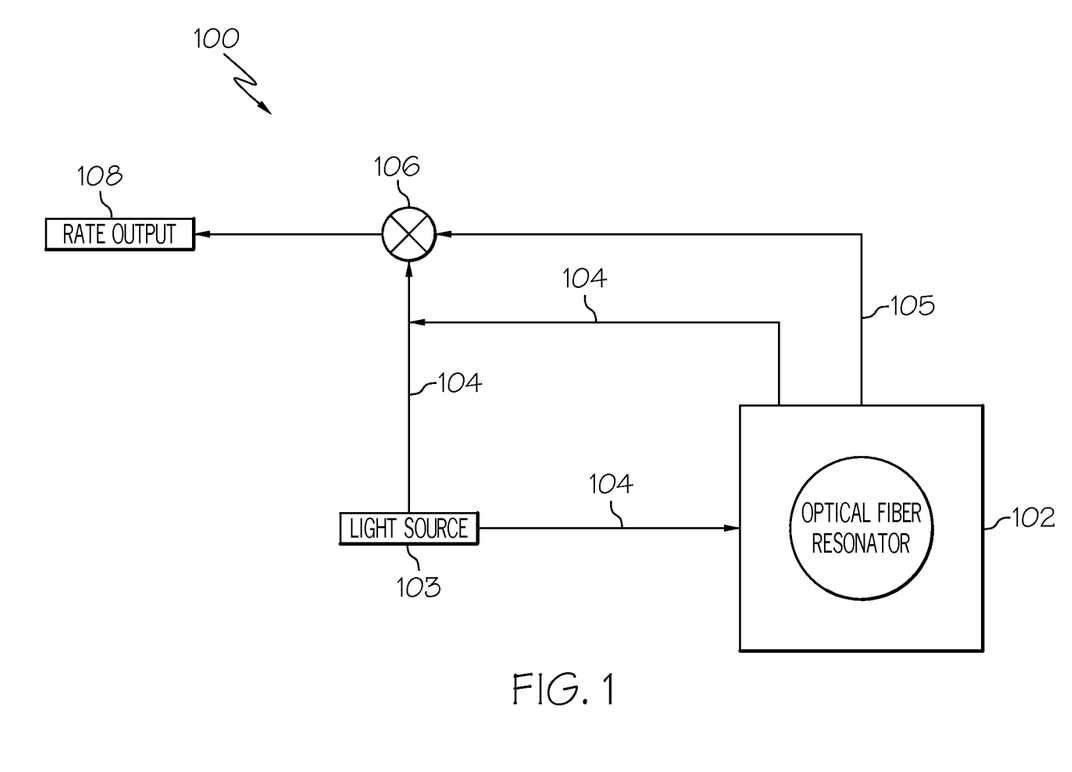
FIG. 1 is a block diagram of a gyroscope system in one embodiment described in the present disclosure.

FIG. 1 is a block diagram of an exemplary system 100 that includes an optical fiber resonator 102 for use in a gyroscope. A gyroscope using an optical fiber resonator 102 is often referred to as a resonator fiber optic gyroscope (RFOG). The optical fiber resonator 102 is any fiber capable of propagating light therein. For example, the optical fiber may be a telecom fiber such as SMF-28 fiber or a polarization maintaining (PM) fiber or a polarizing (PZ) fiber. As used herein, the terms "resonator", "optical fiber resonator", and "optical fiber ring resonator" refer to the optical fiber resonator 102. Light is capable of propagating around the optical fiber resonator 102 in two opposite directions. For example, the light can propagate around the optical fiber resonator 102 simultaneously in both a clockwise and counterclockwise direction.

Light for propagating in the optical fiber coil 102 is generated by a single light source 103 that produces an optical frequency comb 104. In certain embodiments, the optical frequency comb light source (103, 104) can be generated by using a mode locked laser, using a supercontinuum light source, use of optical parametric amplification, use of four wave mixing, use of electro-optic modulation, or the like. The different optical frequencies of the multiple-frequency light beam in the optical frequency comb 104 generated by the light source 103 are locked at resonant frequencies of the optical fiber resonator 102. Further, the frequency difference between two adjacent light beam frequency components, in the multiple-frequency light beam based on the optical frequency comb 104, contains information directly related to the free spectral range of the optical fiber resonator 102. The optical frequency comb spacing can be multiples or submultiples of free spectral range of the optical fiber resonator. In certain embodiments, as the optical frequency comb propagates within the optical fiber coil 102, the optical frequency comb 102 propagates in a clockwise direction.

In embodiments of the present disclosure, as the different optical frequencies propagate through the optical fiber resonator in a clockwise direction, at least one frequency component of the multiple-frequency light beam based on, or comprised of, the optical frequency comb 104 generates stimulated Brillouin scattering within the optical fiber resonator 102 to create a stimulated Brillouin scattering (SBS) light beam 105. The SBS light beam 105 is frequency shifted by a Brillouin shift and propagates within the optical fiber resonator 102 in the opposite direction to that of the optical frequency comb 104. The magnitude of the Brillouin shift is dependent on the material used to manufacture the optical fiber resonator 102. For example, where the optical fiber resonator 102 is manufactured from SMF-28 telecom fiber, the multiple-frequency light beams of the optical frequency comb 104 propagating in the clockwise direction, that have sufficient power, will generate an SBS light beam 105 that have a frequency shifted by about 11 GHz, where the SBS light beam 105 propagates within the optical fiber resonator 102 in the counterclockwise direction. Thus, in certain embodiments, the light source 103 that produces the optical frequency comb 104 functions as a pump laser source for generating a stimulated Brillouin scattering light beam 105 of one or more frequencies within the optical fiber resonator 102. The optical fiber resonator has two different sets of resonance peaks in two counter propagating directions due to Sagnac effect. The stimulated Brillouin scattering is formed at frequencies where the Brillouin gain overlaps with the resonance peaks of the resonator in the counter propagating direction.

In certain embodiments, a portion of the SBS light beam 105 exits the optical fiber resonator through coupling mechanisms known to those skilled in the art and is propagated towards an optical mixer 106. Further, in certain embodiments, the optical mixer 106 receives the optical frequency comb 104 from the single light source and mixes the multiple-frequency light beam in the optical frequency comb 104 and the SBS light beam 105 containing at least one frequency of light received from the optical fiber resonator. Alternatively, the optical mixer 106 receives both the optical frequency comb 104 and the SBS light beam 105 from the optical fiber resonator 102. The mixer 106 mixes the SBS light beam 105 containing the at least one frequency of light and the multiple-frequency light beam in the optical frequency comb 104 to create at least one beat frequency signal. The at least one beat frequency signal is a signal having a frequency that represents the difference between the frequencies of the counter-propagating optical frequency comb 104 and the SBS light beam 105. The optical mixer then provides the at least one beat frequency signal to the rate output 108, where the rate output 108 determines the rate of rotation for the gyroscope based on the beat frequency.

By using a single light source 103 that generates an optical frequency comb 104, a laser resonator gyroscope offers both low cost and high resolution. In particular the single light source 103 that generates the optical frequency comb 104 uses the stimulated SBS light beam 105 generated within the optical fiber resonator 102 to obtain the rotation rate information. Also, because the stimulated SBS light beam 105 is used to provide rate of rotation information, the gyroscope does not include mechanisms to suppress the stimulated Brillouin scattering. Thus, because of the simplified lock-in avoidance mechanism and the use of the stimulated SBS light beam 105 to determine rate of rotation, the gyroscope can be produced at a reduced cost.

Figure 2:
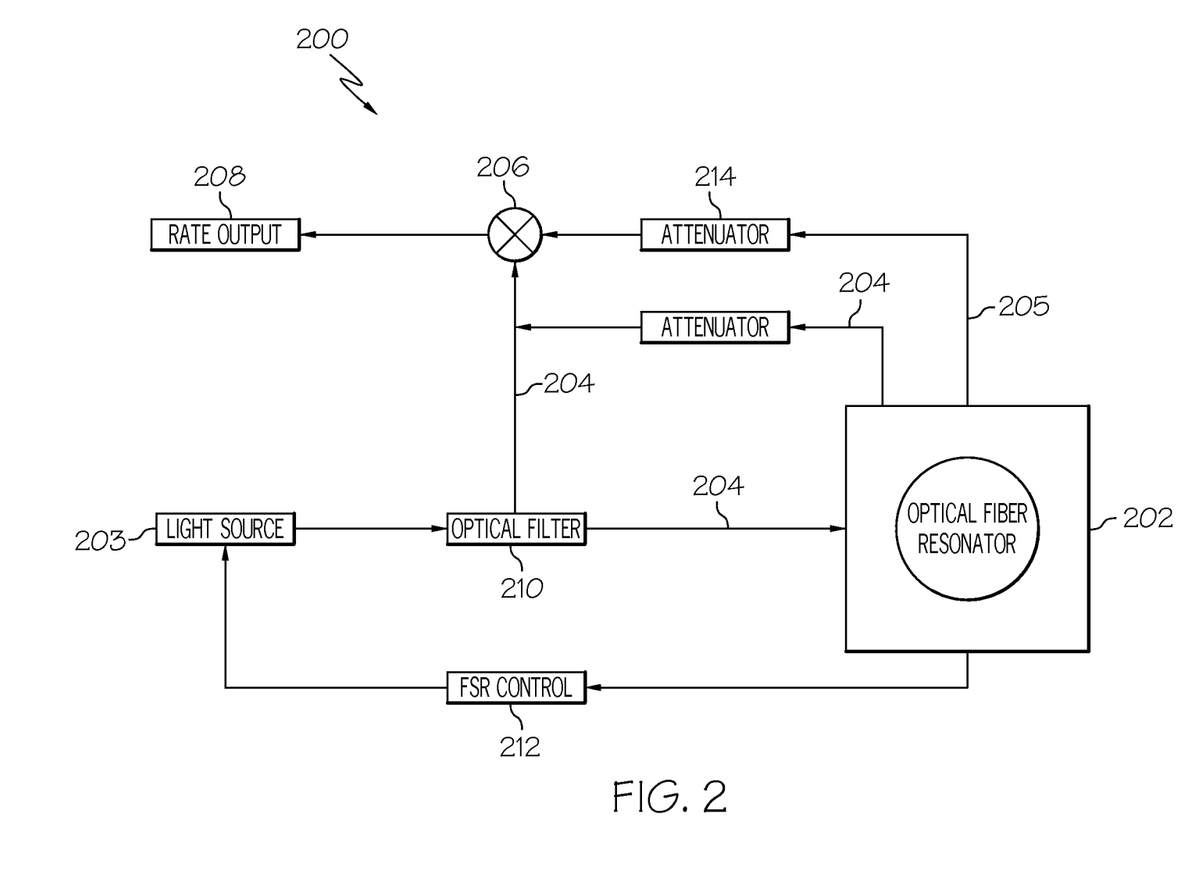
FIG. 2 is a block diagram of a gyroscope system in one embodiment described in the present disclosure.

FIG. 2 is a block diagram illustrating a system 200 that functions as an alternative embodiment of the system 100 described in FIG. 1. In certain embodiments, system 200 includes light source 203, optical fiber resonator 202, optical mixer 206, and rate output 208 that function as equivalents to light source 103, optical fiber resonator 102, optical mixer 106, and rate output 108 described in relation to FIG. 1. Thus, the description of light source 103, optical fiber resonator 102, optical mixer 106, and rate output 108 apply to light source 203, optical fiber resonator 202, optical mixer 206, and rate output 208.

In addition to the components that correspond with components described in relation to system 100 in FIG. 1, system 200 also includes an optical filter 210. Optical filter 210 filters an optical frequency comb 204 received from light source 203 to ensure that the frequencies of the multiple-frequency light beam based on the optical frequency comb 204 do not overlap with the frequencies contained in the spectrum of the SBS light beam 205 propagating within the optical fiber resonator 202. When frequencies of the multiple-frequency light beam based on the optical frequency comb 204 and SBS multiple-frequency light beam 205 overlap in their frequency spectra, and there is optical backscatter from one direction into the other, the counter-propagating signals in the gyroscope can become locked onto one another. As is known by those skilled in the art, when counter-propagating signals become locked onto one another, the measured rotation rate become zero even when the actual value is not zero. The optical filter 210 limits the bandwidth of the frequency comb 204 so that it prevents signals that have similar frequencies from propagating within the optical fiber resonator 202 in opposite directions. For example, where the Brillouin shift for the optical fiber resonator is 11 GHz, the optical filter 210 attenuates an optical frequency comb 204 generated by a light source 203 such that frequencies of signals that are shifted 11 GHz do not overlap with non-shifted frequencies.

In at least one embodiment, system 200 includes a free spectral range control 212. As mentioned above, optical frequency comb 204 includes a multiple-frequency light beam that is locked to resonant frequencies of the optical fiber resonator 202. Further, the frequency components in the optical frequency comb 204 are spaced apart from one another according to multiples or submultiples of the free spectral range of the optical fiber resonator 202. During the operation of system 200, the free spectral range of the optical fiber resonator 202 changes according to the environment of the optical fiber resonator 202. For example, as the optical fiber resonator 202 warms or cools, the optical fiber resonator 202 can accordingly expand or contract, thus changing the length of the optical fiber resonator 202. The expansion and contraction of the optical fiber resonator 202 and change in length of the optical fiber resonator 202 changes the free spectral range of the optical fiber resonator 202. Due to the changing free spectral range, the system 200 includes the free spectral range control 212 to adjust the frequencies of the multiple-frequency light beam produced by the optical frequency comb 204 such that the difference between the frequency components of the multiple-frequency light beam are equal to a multiple or submultiple of the free spectral range of the optical fiber resonator 202. To adjust the frequency spacing to match the free spectral range of the optical fiber resonator 202, the free spectral range control is coupled to the optical fiber resonator 202 and the optical frequency comb 204. The free spectral range control 212 receives an output that includes the optical frequency comb 204 from the optical fiber resonator 202 and determines any adjustments that need to be made to the optical frequency comb 204 so that the differences between the frequencies match a multiple or submultiple of the free spectral range. The free spectral range control 212 determines the adjustments based on a signal provided by the optical fiber resonator 202 and provides the adjustments to the optical frequency comb 204 using methods and systems known to one having skill in the art.

Further, in at least one embodiment, where both the SBS light beam 205 and the multiple frequency light beam based on the optical frequency comb 204 are mixed together after resonating within the optical fiber resonator 202, an attenuator 214 attenuates one or both of the SBS light beam 205 and the optical frequency comb light beam 204. The attenuators 214 can ensure that the signals are at the appropriate signal level for mixing and for the determination of the rate of rotation. In an alternative embodiment, where the SBS light beam 205 are mixed with the multiple frequency light beam based on the optical frequency comb 204 that has been filtered or produced directly from the light source as shown in FIG. 1, an attenuator 214 attenuates the SBS light beam 205 that was produced by the optical fiber resonator 202.

Figure 3A:
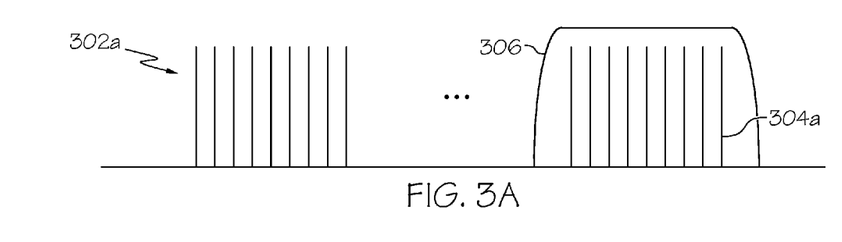
FIGS. 3A-3C are frequency diagrams illustrating the frequencies of stimulated Brillouin scattering (SBS) multiple-frequency light beam and an optical frequency comb in certain embodiments described in the present disclosure.
Figure 3B:
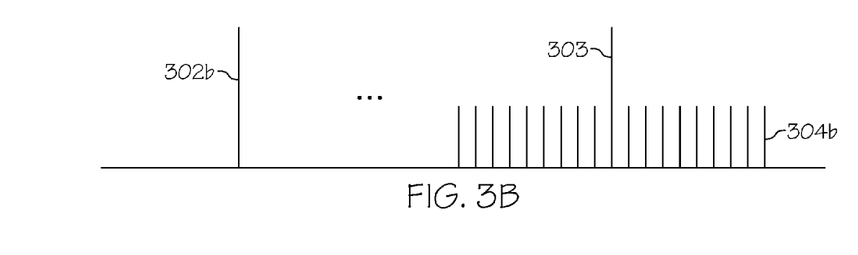
Figure 3C:
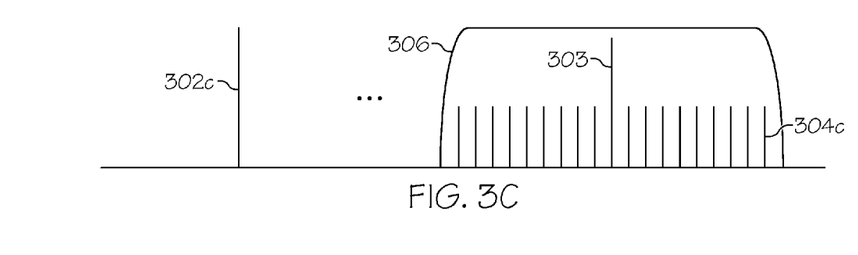

FIGS. 3A-3C illustrate frequency graphs that illustrate the signals produced by the different systems described above in relation to systems 100 and 200. FIG. 3A illustrates the frequencies in the optical frequency comb 304a and the stimulated Brillouin multiple-frequency light beam 302a produced by the propagation of the optical frequency comb 304a within an optical fiber resonator, such as optical fiber resonator 102 in FIG. 1. In certain embodiments, the single light source, producing the optical frequency comb 304a, produces a multiple-frequency light beam with different frequency components having substantially the same amplitude, which amplitude is large enough to generate stimulated Brillouin scattering within an optical fiber. Further, the frequency difference between the components of the multiple-frequency light beam is equal to a multiple or submultiple of the free spectral range.

As the optical frequency comb 304a propagates around an optical fiber, the multiple-frequency light beam in the optical frequency comb 304a generates stimulated Brillouin scattering (SBS) within the optical fiber. The Brillouin scattering creates a multiple-frequency light beam 302a that propagates through the optical fiber in a direction that is opposite to the direction of propagation for the multiple-frequency light beam in the optical frequency comb 304a. Further, the stimulated Brillouin scattering shifts the frequency of the multiple-frequency light beam in the optical frequency comb 304a to produce the Brillouin multiple-frequency light beam 302a. For example, the SBS multiple-frequency light beam 302a is similar to the multiple frequency light beam based on the optical frequency comb 304a, except the SBS multiple-frequency light beam 302a is frequency-shifted by a Brillouin shift. The Brillouin shift is dependent on the material through which the light beams are propagating.

In certain embodiments, the frequencies of the components of the multiple-frequency light beam based on the optical frequency comb 304a may overlap with the frequencies of certain components of the SBS light beam 302a. The overlapping frequencies can cause a gyroscope to exhibit lock-in, which degrades the performance of the gyroscope. The overlapping frequencies could also diminish the ability to precisely lock the CW wave to the CW resonances of the resonator in the presence of optical backscatter. To avoid the overlapping frequencies, the multiple-frequency light beam based on the optical frequency comb 304a can be filtered by optical filter 306 before the light beam containing the optical frequency comb 304a is coupled into the resonator. The optical filter 306 attenuates the frequency spectrum of the light beam comprised of the optical frequency comb 304a that would otherwise overlap with frequencies in the SBS light beam 302a.

FIG. 3B illustrates the frequencies in the optical frequency comb 304b and the SBS light beam 302b produced by the propagation of the optical frequency comb 304b within an optical fiber. In certain embodiments, the single light source, producing the optical frequency comb 304b, produces a multiple-frequency light beam, where a center light beam frequency component 303, having a center frequency, has an intensity that is large enough to generate stimulated Brillouin scattering (SBS) within an optical fiber and the other frequency components in the multiple-frequency light beam have insufficient intensity to stimulate Brillouin scattering. Further, the frequency difference between the frequency components of the multiple-frequency light beam is equal to a multiple or submultiple of the free spectral range.

As the multiple-frequency light beam comprised of the optical frequency comb 304b propagates around an optical fiber, the center light beam frequency component 303, having the center frequency, generates stimulated Brillouin scattering within the optical fiber. The Brillouin scattering creates a SBS light beam 302b that is at a frequency that is equal to the frequency of the center light beam frequency component 303 after being frequency shifted by the Brillouin shift (about 11 GHz) of the optical fiber.

In certain embodiments, the frequencies of the multiple-frequency light beam comprised of the optical frequency comb 304 may overlap with the frequency spectrum contained within the SBS light beam 302b. The overlapping frequencies can cause a gyroscope to exhibit lock-in effects, or degrade the ability to precisely adjust lock the cw wave comb frequencies to the frequencies of the optical fiber resonator as desired, which degrades the performance of the gyroscope. To avoid the problem of overlapping frequencies, the frequency components of the light beam containing the the optical frequency comb 304 include only frequencies that are greater than the frequency of the Brillouin light beam 302b.

FIG. 3C illustrates the frequencies in the optical frequency comb 304c and the SBS light beam 302c produced by the propagation of the optical frequency comb 304c within an optical fiber. In certain embodiments, the single light source, producing the optical frequency comb 304c, produces a multiple-frequency light beam, where a center light beam frequency component 303, having a center frequency, has an intensity that is large enough to generate stimulated Brillouin scattering (SBS) within an optical fiber and the other frequency component of the multiple-frequency light beam have insufficient intensity to generate SBS. Further, the frequency difference between the frequency components of the multiple-frequency light beam is equal to a multiple or submultiple of the free spectral range.

As the multiple-frequency light beam based on the optical frequency comb 304c propagates around an optical fiber, the center light beam frequency component 303, having the center frequency, generates SBS within the optical fiber. The Brillouin scattering creates an SBS light beam 302c that is at a frequency that is shifted from that of beam frequency component 303 by the Brillouin shift (about 11 GHz) of the optical fiber.

In certain embodiments, the frequencies of the multiple-frequency light beam containing the optical frequency comb 304 may overlap with the frequency of the SBS light beam 302c. The overlapping frequencies, in the presence of optical backscatter, can cause a gyroscope to exhibit lock-in, or degrade the precision of the lock between frequencies of the frequency comb 304 and the resonator resonance frequencies which degrades the performance of the gyroscope. To avoid the overlapping frequencies, the multiple-frequency light beam based on, and containing, the optical frequency comb 304c can be filtered by optical filter 306 before the multiple-frequency light beam containing the optical frequency comb 304c is coupled into the resonator fiber. The optical filter 306 eliminates frequency components in optical frequency comb 304c that would overlap with frequencies in the spectrum of the SBS light beam 302c.

Figure 4:
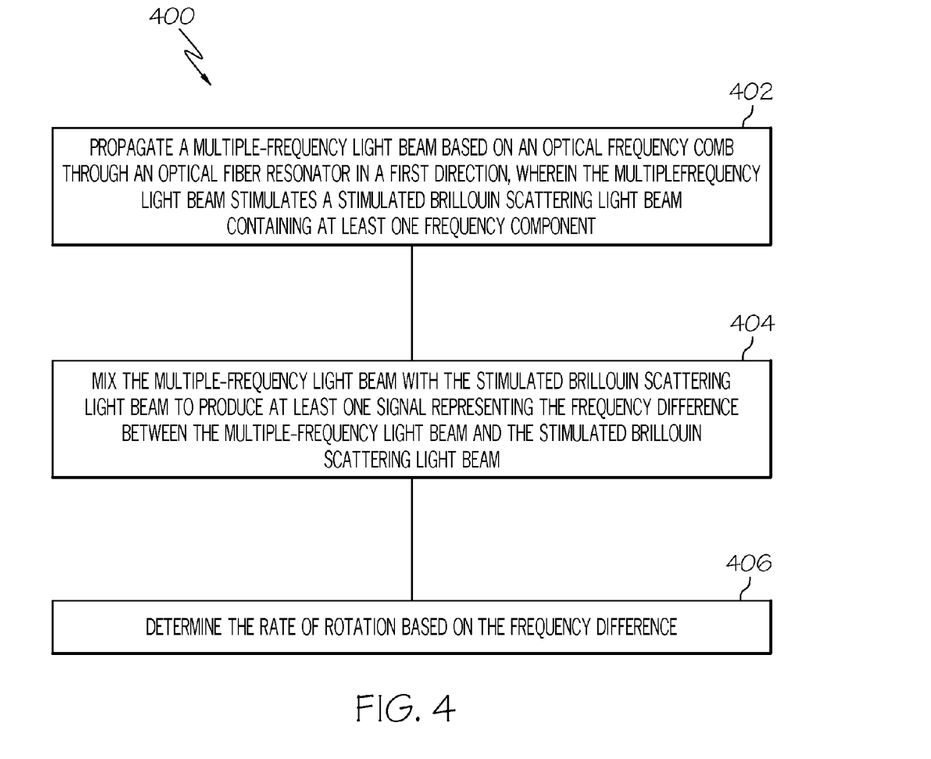
FIG. 4 is a flow diagram of a method for determining the rate of rotation for a gyroscope in one embodiment described in the present disclosure.

FIG. 4 is a flow diagram of a method 400 for acquiring rotation information in an optical frequency comb stimulated Brillouin scattering (SBS) gyroscope. The method proceeds at 402 where a multiple-frequency light beam based on an optical frequency comb is propagated through an optical fiber resonator in a first direction, wherein the multiple-frequency light beam stimulates an SBS light beam containing at least one frequency component. Further, the frequency components of the optical frequency comb are locked to the resonance peaks of the resonator through servo electronics. For example, a single light source generates a multiple-frequency light beam based on an optical frequency comb that propagates through an optical fiber resonator in a clockwise direction. The multiple-frequency light beam containing the optical frequency comb generates an SBS light beam with at least one frequency component, where the SBS light beam containing the at least one frequency component propagates through the optical fiber resonator in a counterclockwise direction. Further the frequencies of the SBS light beam containing the at least one frequency component are shifted by a Brillouin shift associated with the material used to fabricate the optical fiber resonator.

Method 400 proceeds at 404 where the multiple-frequency light beam is mixed with the SBS light beam to produce at least one signal representing the frequency difference between the multiple-frequency light beam and the SBS light beam. Further, the method 400 proceeds at 406, where the rate of rotation is determined based on the frequency difference. For example, as the gyroscope rotates the frequency difference between the SBS light beam containing at least one frequency component and the multiple-frequency light beam changes in proportion to the rate of rotation. Thus the difference between the frequency of the SBS light beam containing at least one frequency component and the multiple-frequency light beam can be used to determine the rate of rotation.

Example Embodiments

Example 1 includes a system comprising: a light source configured to produce a multiple-frequency light beam based on an optical frequency comb; an optical fiber resonator coupled to the light source, the multiple-frequency light beam based on an optical frequency comb generated by the light source propagating in a first direction within the optical fiber resonator, wherein the multiple-frequency light beam based on an optical frequency comb generates stimulated Brillouin scattering for at least one frequency, wherein the Brillouin scattering generates a stimulated Brillouin scattering light beam containing at least one frequency component to propagate in the optical fiber resonator in a second direction, the first direction being opposite in direction to the second direction; at least one servo that controls the frequencies of the optical frequency comb so that a plurality of component frequencies of the optical frequency comb are locked on resonance peaks of the optical fiber resonator in the first direction; and a mixer configured to determine a frequency difference between the stimulated Brillouin scattering light beam and the multiple-frequency light beam.

Example 2 includes the system of Example 1, wherein the light source generates the multiple-frequency light beam through at least one of the following methods: mode locking of a laser; supercontinuum generation or amplification; optical parametric amplification; four wave mixing; and electro-optic modulation.

Example 3 includes the system of any of Examples 1-2, wherein the optical fiber resonator comprises a material that has a Brillouin shift that is sufficiently large enough such that a first frequency spectrum of the multiple-frequency light beam does not overlap with a second frequency spectrum of the stimulated Brillouin scattering light beam.

Example 4 includes the system of any of Examples 1-3, wherein the at least one servo obtains feedback signals from processed resonator output that contains information about deviation of the plurality of component frequencies from resonance peaks in the first direction of the optical fiber resonator.

Example 5 includes the system of any of Examples 1-4, wherein frequency components of the optical frequency comb have a frequency separation that tracks free spectral range drift of the optical fiber resonator.

Example 6 includes the system of any of Examples 1-5, further comprising an optical filter configured to filter the multiple-frequency light beam such that a first frequency range of the optical frequency comb does not overlap with a second frequency range of the stimulated Brillouin scattering light beam.

Example 7 includes the system of Example 6, wherein the mixer is coupled to the optical filter such that the mixer receives the multiple-frequency light beam after the multiple-frequency light beam is filtered.

Example 8 includes the system of any of Examples 1-7, wherein a frequency component in the plurality of frequency components at the center frequency of the optical frequency comb stimulates the Brillouin scattering in the optical fiber resonator.

Example 9 includes the system of any of Examples 1-8, wherein the mixer receives both the multiple-frequency light beam and the stimulated Brillouin scattering light beam from the optical fiber resonator.

Example 10 includes the system of any of Examples 1-9, further comprising at least one attenuator configured to attenuate at least one of the multiple-frequency light beam and the stimulated Brillouin scattering light beam before the mixer determines the frequency difference between the stimulated Brillouin scattering light beam and the multiple-frequency light beam.

Example 11 includes a gyroscope comprising: an optical fiber resonator; a light source configured to provide a multiple-frequency light beam based on an optical frequency comb to the optical fiber resonator, the multiple-frequency light beam propagating through the optical fiber resonator in a first direction within the optical fiber resonator, wherein the multiple-frequency light beam stimulates Brillouin scattering for at least one frequency, the Brillouin scattering causing a stimulated Brillouin scattering light beam containing at least one frequency component to propagate in the optical fiber resonator in a second direction, the first direction being opposite in direction to the second direction, wherein a plurality of frequency components in the multiple-frequency light beam are locked to resonance peaks of the optical fiber resonator and the plurality of frequency components have a frequency separation that tracks free spectral range drift of the optical fiber resonator; a mixer configured to determine a frequency difference between the at least one stimulated Brillouin scattering light beam and the multiple-frequency light beam; and a rate output coupled to the mixer, the rate output configured to determine the rate of rotation based on the frequency difference.

Example 12 includes the gyroscope of Example 11, further comprising a free spectral range control coupled between the optical fiber resonator and the light source, the free spectral range control configured to adjust the frequency separation of the multiple-frequency light beam to track the free spectral range of the optical fiber resonator.

Example 13 includes the gyroscope of any of Examples 11-12, wherein the optical fiber resonator comprises a material that has a Brillouin shift that is sufficiently large enough such that a first frequency range of the multiple-frequency light beam does not overlap with a second frequency range of the stimulated Brillouin scattering light beam.

Example 14 includes the gyroscope of any of Examples 11-13, further comprising an optical filter configured to filter the spectrum of the multiple-frequency light beam such that a first frequency range of the multiple-frequency light beam does not overlap with a second frequency range of the stimulated Brillouin scattering light beam.

Example 15 includes the gyroscope of Example 14, wherein the mixer is coupled to the optical filter such the mixer receives the multiple-frequency light beam after the multiple-frequency light beam is filtered.

Example 16 includes the gyroscope of any of Examples 11-15, wherein a center frequency of the multiple-frequency light beam stimulates Brillouin scattering in the optical fiber resonator.

Example 17 includes the gyroscope of any of Examples 11-16, wherein the mixer receives both the multiple-frequency light beam and the stimulated Brillouin scattering light beam from the optical fiber resonator.

Example 18 includes a method for measuring rotation, the method comprising: propagating a multiple-frequency light beam based on an optical frequency comb through an optical fiber resonator in a first direction, wherein the multiple-frequency light beam stimulates a stimulated Brillouin scattering light beam containing at least one frequency component, the stimulated Brillouin scattering light beam propagating through the optical fiber resonator in a second direction, wherein the first direction is opposite to the second direction; mixing the multiple-frequency light beam with the stimulated Brillouin scattering light beam to produce at least one signal representing the frequency difference between the multiple-frequency light beam and the stimulated Brillouin scattering light beam; and determining the rate of rotation based on the frequency difference.

Example 19 includes the method of Example 18, further comprising controlling a light source that produces the multiple-frequency light beam such that a plurality of frequency components of the multiple-frequency light beam are locked to resonance peaks of the optical fiber resonator and have a frequency separation that tracks free spectral range drift of the optical fiber resonator.

Example 20 includes the method of any of Examples 18-19, further comprising filtering the multiple-frequency light beam such that a first frequency range of the multiple-frequency light beam does not overlap with a second frequency range of the stimulated Brillouin scattering light beam.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
a light source configured to produce a multiple-frequency light beam based on an optical frequency comb;
an optical fiber resonator coupled to the light source, the multiple-frequency light beam based on an optical frequency comb generated by the light source propagating in a first direction within the optical fiber resonator, wherein the multiple-frequency light beam based on an optical frequency comb generates stimulated Brillouin scattering for at least one frequency, wherein the Brillouin scattering generates a stimulated Brillouin scattering light beam containing at least one frequency component to propagate in the optical fiber resonator in a second direction, the first direction being opposite in direction to the second direction;
at least one servo that controls the frequencies of the optical frequency comb so that a plurality of component frequencies of the optical frequency comb are locked on resonance peaks of the optical fiber resonator in the first direction; and
a mixer configured to determine a frequency difference between the stimulated Brillouin scattering light beam and the multiple-frequency light beam.

2. The system of claim 1, wherein the light source generates the multiple-frequency light beam through at least one of the following methods:
mode locking of a laser;
supercontinuum generation or amplification;
optical parametric amplification;
four wave mixing; and
electro-optic modulation.

3. The system of claim 1, wherein the optical fiber resonator comprises a material that has a Brillouin shift that is sufficiently large enough such that a first frequency spectrum of the multiple-frequency light beam does not overlap with a second frequency spectrum of the stimulated Brillouin scattering light beam.

4. The system of claim 1, wherein the at least one servo obtains feedback signals from processed resonator output that contains information about deviation of the plurality of component frequencies from resonance peaks in the first direction of the optical fiber resonator.

5. The system of claim 1, wherein frequency components of the optical frequency comb have a frequency separation that tracks free spectral range drift of the optical fiber resonator.

6. The system of claim 1, further comprising an optical filter configured to filter the multiple-frequency light beam such that a first frequency range of the optical frequency comb does not overlap with a second frequency range of the stimulated Brillouin scattering light beam.

7. The system of claim 6, wherein the mixer is coupled to the optical filter such that the mixer receives the multiple-frequency light beam after the multiple-frequency light beam is filtered.

8. The system of claim 1, wherein a frequency component in the plurality of frequency components at the center frequency of the optical frequency comb stimulates the Brillouin scattering in the optical fiber resonator.

9. The system of claim 1, wherein the mixer receives both the multiple-frequency light beam and the stimulated Brillouin scattering light beam from the optical fiber resonator.

10. The system of claim 1, further comprising at least one attenuator configured to attenuate at least one of the multiple-frequency light beam and the stimulated Brillouin scattering light beam before the mixer determines the frequency difference between the stimulated Brillouin scattering light beam and the multiple-frequency light beam.

11. A gyroscope comprising:
an optical fiber resonator;
a light source configured to provide a multiple-frequency light beam based on an optical frequency comb to the optical fiber resonator, the multiple-frequency light beam propagating through the optical fiber resonator in a first direction within the optical fiber resonator, wherein the multiple-frequency light beam stimulates Brillouin scattering for at least one frequency, the Brillouin scattering causing a stimulated Brillouin scattering light beam containing at least one frequency component to propagate in the optical fiber resonator in a second direction, the first direction being opposite in direction to the second direction,
wherein a plurality of frequency components in the multiple-frequency light beam are locked to resonance peaks of the optical fiber resonator and the plurality of frequency components have a frequency separation that tracks free spectral range drift of the optical fiber resonator;
a mixer configured to determine a frequency difference between the at least one stimulated Brillouin scattering light beam and the multiple-frequency light beam; and
a rate output coupled to the mixer, the rate output configured to determine the rate of rotation based on the frequency difference.

12. The gyroscope of claim 11, further comprising a free spectral range control coupled between the optical fiber resonator and the light source, the free spectral range control configured to adjust the frequency separation of the multiple-frequency light beam to track the free spectral range of the optical fiber resonator.

13. The gyroscope of claim 11, wherein the optical fiber resonator comprises a material that has a Brillouin shift that is sufficiently large enough such that a first frequency range of the multiple-frequency light beam does not overlap with a second frequency range of the stimulated Brillouin scattering light beam.

14. The gyroscope of claim 11, further comprising an optical filter configured to filter the spectrum of the multiple-frequency light beam such that a first frequency range of the multiple-frequency light beam does not overlap with a second frequency range of the stimulated Brillouin scattering light beam.

15. The gyroscope of claim 14, wherein the mixer is coupled to the optical filter such the mixer receives the multiple-frequency light beam after the multiple-frequency light beam is filtered.

16. The gyroscope of claim 11, wherein a center frequency of the multiple-frequency light beam stimulates Brillouin scattering in the optical fiber resonator.

17. The gyroscope of claim 11, wherein the mixer receives both the multiple-frequency light beam and the stimulated Brillouin scattering light beam from the optical fiber resonator.

18. A method for measuring rotation, the method comprising:
propagating a multiple-frequency light beam based on an optical frequency comb through an optical fiber resonator in a first direction, wherein the multiple-frequency light beam stimulates a stimulated Brillouin scattering light beam containing at least one frequency component, the stimulated Brillouin scattering light beam propagating through the optical fiber resonator in a second direction, wherein the first direction is opposite to the second direction;
mixing the multiple-frequency light beam with the stimulated Brillouin scattering light beam to produce at least one signal representing the frequency difference between the multiple-frequency light beam and the stimulated Brillouin scattering light beam; and
determining the rate of rotation based on the frequency difference.

19. The method of claim 18, further comprising controlling a light source that produces the multiple-frequency light beam such that a plurality of frequency components of the multiple-frequency light beam are locked to resonance peaks of the optical fiber resonator and have a frequency separation that tracks free spectral range drift of the optical fiber resonator.

20. The method of claim 18, further comprising filtering the multiple-frequency light beam such that a first frequency range of the multiple-frequency light beam does not overlap with a second frequency range of the stimulated Brillouin scattering light beam.

* * * * *